United States Patent
Costle et al.

(10) Patent No.: US 9,310,812 B2
(45) Date of Patent: Apr. 12, 2016

(54) MULTI-STAGE PRESSURE REGULATOR AND METHOD FOR FLUID PRESSURE REGULATION

(71) Applicant: Illinois Tool Works Inc., Glenview, IL (US)

(72) Inventors: Carey Costle, Tucson, AZ (US); Anthony S. Hollars, Tucson, AZ (US)

(73) Assignee: Illinois Tool Works Inc., Glenview, IL (US)

( * ) Notice: Subject to any disclaimer, the term of this patent is extended or adjusted under 35 U.S.C. 154(b) by 69 days.

(21) Appl. No.: 13/835,528

(22) Filed: Mar. 15, 2013

(65) Prior Publication Data

US 2014/0102560 A1     Apr. 17, 2014

Related U.S. Application Data

(60) Provisional application No. 61/713,162, filed on Oct. 12, 2012.

(51) Int. Cl.
*F16K 31/12* (2006.01)
*G05D 16/10* (2006.01)

(52) U.S. Cl.
CPC .............. *G05D 16/10* (2013.01); *G05D 16/103* (2013.01); *Y10T 137/7795* (2015.04)

(58) Field of Classification Search
CPC . G05D 16/103; G05D 16/10; Y10T 137/7795
USPC ............. 137/505.12, 505.25, 505.13, 505.41, 137/505.42, 505.27, 505.4, 505.35
See application file for complete search history.

(56) References Cited

U.S. PATENT DOCUMENTS

| | | | | |
|---|---|---|---|---|
| 2,313,564 | A * | 3/1943 | Manly ........................ | 137/116.5 |
| 2,642,701 | A * | 6/1953 | Goodner .................. | 137/505.12 |
| 3,481,357 | A * | 12/1969 | Scheflow ................... | 137/116.5 |
| 3,926,208 | A * | 12/1975 | Hoffman .................... | 137/484.8 |
| 4,149,559 | A * | 4/1979 | Wormser ................. | 137/505.18 |
| 5,566,713 | A * | 10/1996 | Lhomer et al. ............... | 137/613 |
| 7,059,343 | B2 * | 6/2006 | Carroll ..................... | 137/505.25 |
| 7,080,655 | B2 * | 7/2006 | Jacksier et al. ................. | 137/14 |
| 7,309,113 | B2 * | 12/2007 | Carter ........................ | 303/119.1 |
| 7,334,598 | B1 | 2/2008 | Hollars | |

(Continued)

FOREIGN PATENT DOCUMENTS

GB     816756 A     7/1959

OTHER PUBLICATIONS

European Search Report dated Apr. 24, 2015, (EP13188213).

*Primary Examiner* — Jessica Cahill

(74) *Attorney, Agent, or Firm* — Dale F. Regelman; Quarles & Brady LLP

(57) ABSTRACT

A multi-stage fluid pressure regulator, including a first stage valve arranged to open and close a fluid flow path to control flow of fluid through the valve, a first stage piston arranged for movement to open and close the first stage valve, the piston having an inner side and an outer side, a gas delivery conduit having a proximal end attached to the first stage piston and a distal end extending away from the first stage piston, the gas delivery conduit having a passage in fluid communication with the inner side of the first stage piston, and a second stage valve in fluid communication with the gas delivery conduit, the second stage valve including a second valve chamber into which the distal end of the gas delivery conduit is positioned.

18 Claims, 2 Drawing Sheets

(56) References Cited

U.S. PATENT DOCUMENTS

| | | | |
|---|---|---|---|
| 7,828,009 B2 * | 11/2010 | Neumann et al. | 137/505.25 |
| 2003/0066562 A1 | 4/2003 | Wakeman | |
| 2006/0157122 A1 | 7/2006 | Kawamura et al. | |
| 2010/0175763 A1 * | 7/2010 | Newman et al. | 137/505.42 |
| 2011/0155267 A1 * | 6/2011 | Nicolini et al. | 137/511 |

* cited by examiner

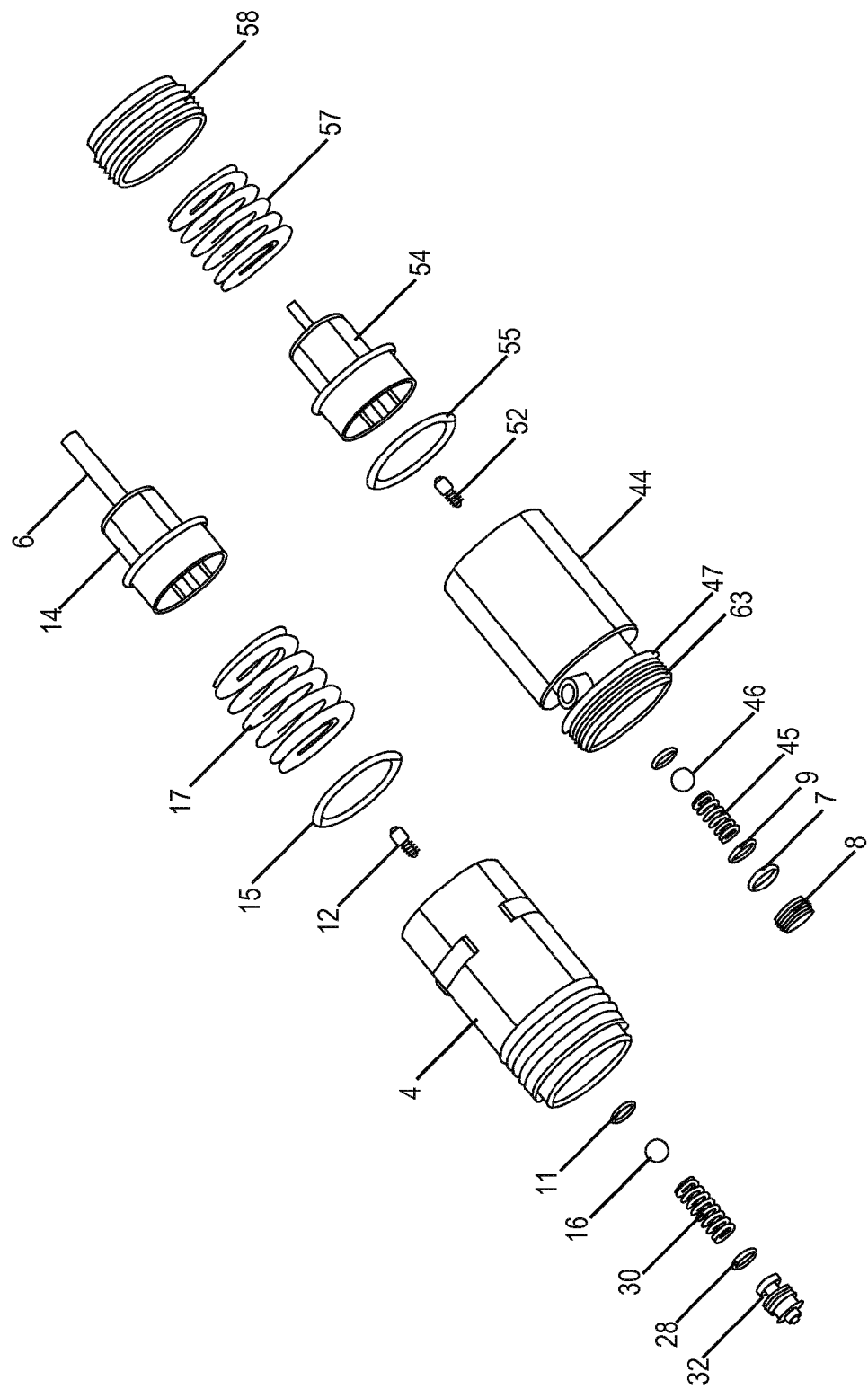

US 9,310,812 B2

MULTI-STAGE PRESSURE REGULATOR AND METHOD FOR FLUID PRESSURE REGULATION

CROSS REFERENCE TO RELATED APPLICATIONS

This application is a Nonprovisional Patent Application which claims priority form U.S. Provisional Patent Application having Ser. No. 61/713,162, filed on Oct. 12, 2012, and which hereby is incorporated by reference.

FIELD OF THE INVENTION

Aspects of the invention relate to a pressure regulator, such as a regulator that includes two or more stages for pressure regulation.

BACKGROUND OF THE INVENTION

Pressure regulators have existed for many years Two major species of mechanical fluid pressure regulators are common: piston-type and diaphragm-type. In general, however, these have not proven entirely satisfactory in practice.

A piston-type regulator uses a spring-biased piston in a bore to regulate output pressure with the piston always trying to reside in equilibrium. When not in equilibrium, the piston moves up or down in the bore thus opening or shutting an intake valve from a high-pressure source. One side of the piston is biased by a spring force and the other side of the piston is biased by pressurized gas.

A diaphragm-type regulator works in a very similar way. Rather than moving a piston in a bore, a diaphragm acts as a flexure, biased on one side typically by a spring. The other side of the diaphragm contains the regulated pressure. When the biasing forces on each side are not in equilibrium, the diaphragm flexes thus opening or closing an inlet valve from the high-pressure source.

Regulators that are designed to handle high source pressures, whether they be of the piston-type or diaphragm-type typically use a hard valve and seat as the major components of the inlet valve assembly. The design of a hard valve and seat works well until the smallest bit of contamination, corrosion, or surface imperfection or seal 'set' is introduced into the valve assembly. The result is a faulty regulator that will not predictably produce a substantially constant outlet pressure.

Likewise, a piston-type or diaphragm-type regulator designed to regulate lower source pressures typically uses a soft elastomeric seal in the valve assembly to hold back the source pressure. This art is less prone to failure due to contamination, corrosion, or surface imperfections compared to the hard valve and seat because the elastomeric seal conforms to minor valve imperfections. Unfortunately, an elastomeric seal is not capable of retaining high source pressures because the high pressures may cause permanent deformation and/or swelling. In addition, explosive decompression results when the high-pressure source is suddenly removed from an elastomeric seal sometimes causing a permanently defective seal.

SUMMARY OF THE INVENTION

The present invention has solved the problems cited above. Broadly, this is a two stage regulator design, wherein both stages utilize the advantages of both hard seat and soft elastomeric seal. Applicants' two-stage regulator is designed to be sealed by at least two elastomeric seals each being supported on a rigid seat.

The benefits in this design allow source pressures to be rather low or extremely high. Typically, the flow-obstructing component of this assembly is a rigid ball or substantially circular disk. The rigid seat allows only the obstructing component of the valve to compress the elastomeric seal a predetermined amount. Any additional forces on the valve obstructing part, such as from a high source pressure, transfer to the rigid valve seat, thus not further compressing the elastomeric seal and damaging it.

BRIEF DESCRIPTION OF THE DRAWINGS

The invention will be better understood from a reading of the following detailed description taken in conjunction with the drawings in which like reference designators are used to designate like elements, and in which:

FIG. 2 shows an exploded view of the FIG. 1 embodiment.

DETAILED DESCRIPTION OF PREFERRED EMBODIMENTS

Figure 1:
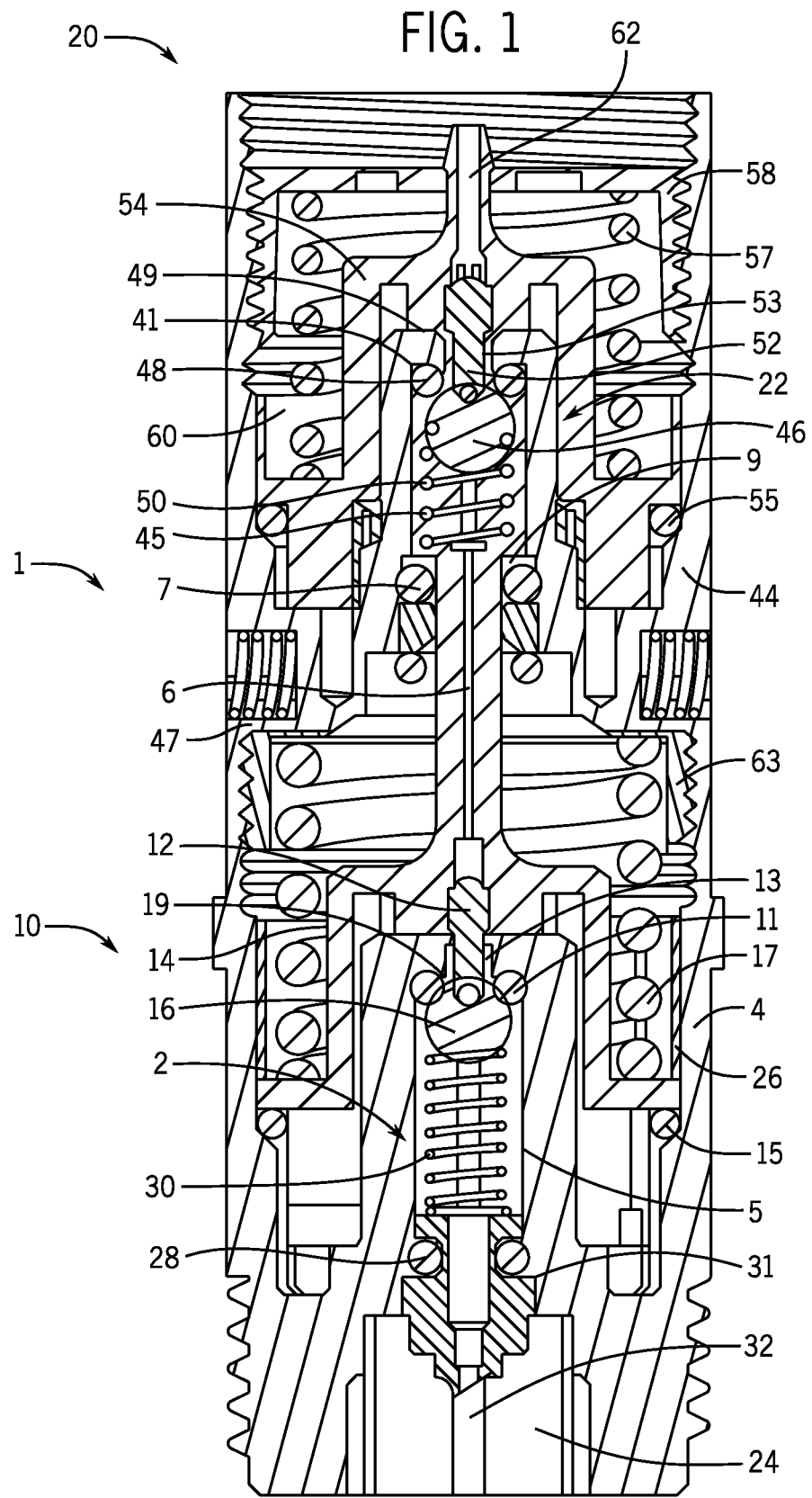
FIG. 1 shows a cross sectional side view of a multi-stage fluid pressure regulator in an illustrative embodiment.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates a cross sectional view of an exemplary embodiment of a two stage pressure regulator 1 that incorporates one or more aspects of the invention. Although embodiments described herein are used with a pressurized cartridge (not shown) containing $CO_2$ gas, other pressurized gases or fluids may be harnessed out of compressed gas cartridges such as nitrogen or oxygen. The pressure regulator includes a first stage 10 and a second stage 20 that operate to reduce the pressure from a cylinder (which may be approximately 2600-3000 psi or more, or less) which is received at a receiver opening 24 and pierced by a lance 32 to cause the release of gas from the cylinder.

In certain embodiments, the first stage 10 reduces the pressure of gas received from the cylinder to a first level, e.g., in a range of 30-60 psi. In certain embodiments, the second stage 20 reduces the pressure of gas received from the first stage 10 to a yet lower level, e.g., in a range of 15-30 psi. In certain embodiments, lance 32 is press-fit into (or otherwise engaged with) an opening formed in the first stage regulator body 4, and may include an annular groove 31 that receives a piercing lance sealing ring 28. The sealing ring 28 creates an airtight seal between lance 32 and the first stage regulator body 4, e.g., so gas received from the cylinder does not leak past the sealing ring 28. The lance 32 may employ hollow and/or solid piercing lance designs, and may create a seal with a gasket (such as an o-ring, not shown) that is positioned between the lance 32 and a cylinder when the lance 32 is used to pierce the cylinder. The cylinder may be held in a cup (not shown) that engages with a thread at the bottom of the first stage body 4 around the receiver opening 24 so that threading the cup onto the first stage body 4 pushes the neck of the cylinder into the receiver opening 24, causing the lance 32 to pierce the cylinder and a seal (such as an O-ring) to engage with the cylinder and lance 32 to prevent leakage of gas. Such cylinder receiver and sealing arrangements are well known, e.g., from U.S. Pat. No. 7,334,598, and thus details are not repeated herein.

With a cylinder received at the receiver opening 24 and pierced by the lance 32, a valve chamber 5 of the first stage regulator 10 receives relatively pressure gas from the cylinder via a conduit in the lance 32. Flow of gas from the valve chamber 5 (through a plunger channel 13) is controlled by a valve assembly 2 that includes a spring 30 which urges a ball 16 upwardly into contact with a sealing ring 11, e.g., a resilient O-ring. Contact of the ball 16 with the sealing ring 11 prevents the flow of gas from the valve chamber 5 through the plunger channel 13. Higher forces placed on the ball 16, e.g., by a relatively high pressure differential between the valve chamber 5 and the plunger channel 13 and/or the force of the spring 30 on the ball 16, may cause the ball 16 to contact a valve ball seat 19 at a lower end of the plunger channel 13. Thus, movement of the ball 16 relative to (i.e., toward and away from) the sealing ring 11 and the valve ball seat 19 can control the flow of gas from the valve chamber 5.

Movement of the ball 16 is controlled by a plunger 12, which is attached to a piston 14 arranged for movement in a piston bore 26 of the first stage body 4. A piston spring 17 urges the piston 14 downwardly in the bore 26 (and thus moves the plunger 12 and ball 16 downwardly), while gas pressure (provided by gas emitted from the valve chamber 5 through the plunger channel 13) at an inner, bottom surface of the piston 14 urges the piston 14 to move upwardly (and thus moves the plunger 12 upwardly, allowing the spring 30 to move the ball 16 upwardly). A piston seal 15 is arranged to engage with a stepped surface of the piston 14 and with a tapered, stepped or other sealing surface of the piston bore 26 to control the flow of gas from inside the piston 14 to outside the piston (e.g., to a space where the piston spring 17 is located). Gas in the area outside of the piston 14 is vented from the body 4 by a vent, e.g., a hole (not shown) in the first stage body 4. Thus, when the piston 14 is moved downwardly by the piston spring 17, flow from inside of the piston 14 is stopped by the piston seal 15 although flow from the valve chamber 5 is permitted, and when the piston 14 is moved upwardly, flow from inside the piston 14 past the piston seal 15 is permitted but flow from the valve chamber 5 is stopped. As will be understood by those of skill in the art, movement of the piston 14, and the corresponding movement of the plunger 12 and ball 16 as influenced by the piston spring 17 and the spring 30, will provide a pressure-regulated flow of gas from the valve chamber 5. Generally speaking, a compressive force on the piston spring 17 (and/or a spring constant of the spring 17) will define the pressure of gas released by the valve assembly 2.

The second stage 20 of the pressure regulator 1 is configured similarly to the first stage 10, and includes a second stage regulator body 44 with a male thread 63 that is received into a corresponding female thread of the first stage body 4. Thus, the second stage 20 includes a valve chamber 45 having a valve assembly 22 that controls the flow of gas passing through second stage 20. The valve assembly 22 includes a rigid valve ball 46, a spring 50, and a valve ball sealing ring 48 received in a groove 41 at the downstream end of the valve chamber 45. Rigid valve ball 46 is preferably made of a hard, metallic material such as stainless steel or hard-chrome plated steel. Other materials, even non-metallic, possessing adequate material properties are also possible. A valve ball seat 49 extends into the valve chamber 45 to limit the motion of the valve ball 46 during inoperative periods and high-pressure situations such that sealing ring 48 is prevented from over-deformation and/or permanent deformation, i.e., the valve ball seat 49 supports the valve ball 46 when the valve assembly 22 is closed, thereby enabling long-term containment of unused gas. As noted above, the valve assembly 2 of the first stage 10 is arranged in a similar way to the valve assembly 22. Additionally, this design of a supportive valve ball seat enables extremely high pressures and pressure shocks to be reliably contained within valve chambers 5, 45 as is the case upon lancing a compressed gas cartridge where initial cartridge lancing can slam the valve assembly 2, 22 with high pressure gas. Additional benefits of a rigid valve ball seat limiting travel of the valve ball allows the valve assembly to handle cold and hot temperatures as well as temperature swings during service, thereby affecting seal hardness as is common when harnessing high-pressure compressed gas cartridges, particularly at high flow rates where the gas is cool due to its changing from a substantially liquid phase in the cartridge to a gaseous phase upon exiting the cartridge. The controlled limited compression of the sealing ring 11, 48 prevents the sealing ring from taking a permanent compression set, yet allows for a reliable seal.

Immediately downstream from the valve ball seat 49 is a plunger channel 53. The plunger channel 53 is dimensioned to receive a plunger 52 that contacts the valve ball 46 to open the valve assembly 22. The dimensions of the plunger 52 are slightly smaller than plunger channel 53. Two reasons for these dimensions are to allow the plunger 52 to freely move in the plunger channel 53 as well as allowing means for a fluid connection between valve chamber 45 and downstream to a regulated pressure contained on the inner, bottom side of a piston 54.

The plunger 52 is connected to the piston 54, e.g., is formed as a separate part that is attached to the piston 54, but may be made as a unitary part with the piston 54. The piston 54 is sized to move freely in a piston bore 60 of the second stage regulator body 44, and also to allow gas flow from the inner, bottom side of the piston 54 to an outer, upper side of the piston 54 past a piston seal 55 when the piston 54 is suitably positioned so that the piston seal 55 does not close a flow channel. Located on the topside of the piston 54 is a compression piston spring 57 which contacts the top of the piston 54 and is retained in the piston bore 60 by a cap 58. The cap 58 has a male thread and correspondingly threads into a female thread of the second stage regulator body 44. The cap 58 may have a grip feature, such as a hex key slot, screwdriver slot, knob, etc., formed as part of the cap 58 to allow adjustment of the cap 58 relative to the second stage body 44 to adjust a preload on the piston spring 57. As mentioned above, this preload or compression force on the spring 57 may adjust a pressure of gas emitted by the second valve assembly 22. The regulator body 44 and/or the cap 58 may include a hole or other opening to allow any gas pressure on the topside of piston 54 to vent.

With downward movement of the piston 54, and prior to the piston 54 bottoming out in the piston bore 60, the plunger 52 contacts the valve ball 46 and opens the valve assembly 22. When the valve assembly 22 is open, gas flow is permitted between the valve chamber 45 and the piston bore 60, so long as the piston 54 is not moved sufficiently downward to allow the piston seal 55 to engage with a stepped or beveled surface of the bore 60 to stop flow.

Upon introduction of a high-pressure gas from the first stage 10 to the valve assembly 22, gas travels through the valve assembly 22 and creates a regulated pressure pushing up on the piston 54 and piston spring 57. The selected spring rate of piston spring 57 combined with the pre-loading of the piston spring 57 by the cap 58 determines regulated pressure output via an exit conduit 62 which taps off of the top of the piston 54. Generally, a higher spring force creates a higher regulated pressure. The exit conduit 62 could be connected to a hose, a threaded fitting or other component which delivers the pressure-regulated gas for use, such as in inflating a tire, driving liquid from a beverage container, or other pneumatic or hydraulic device that uses a regulated, substantially constant working pressure gas. Alternately, a pressure-regulated supply of gas may be received from the second stage body 44, e.g., by a component that threadedly engages with the body 44 above the cap 58.

As regulated pressure gas is tapped off the exit conduit 62, the pressure at the conduit 62 decreases, and in effect reduces the pressure contained on the bottom side of piston 54, allowing the piston 54 to move down in the piston bore 60 ultimately opening valve assembly 22 with plunger 52. The opened valve assembly 22 again introduces additional high-pressure fluid through the plunger channel 53 and increases the pressure contained by piston 54, in effect, biasing piston 54 upward in the piston bore 60 and closing the valve assembly 22, thereby substantially maintaining a consistent regulated pressure at the exit conduit 62. The first stage regulator 10 operates in substantially the same way as the second stage regulator 20, although gas pressure on an upper, outer side of the first stage piston 14 need not influence the piston's movement since the piston bore 26 may be vented.

In accordance with one aspect of the invention, the piston of the first stage regulator includes a gas delivery conduit that is in direct fluid communication with the valve chamber of the second stage regulator. In one embodiment, the gas delivery conduit is movable relative to the valve chamber, e.g., the gas delivery conduit may move into and out of the valve chamber. The gas delivery conduit may sealingly engage with the valve chamber in such a way as to allow movement of the gas delivery conduit relative to the valve chamber. For example, an outer surface of the gas delivery conduit may engage with an o-ring or other suitable seal that allows for movement of the conduit relative to the seal while resisting fluid leakage from the valve chamber. This arrangement may provide for the delivery of pressure regulated fluid to the valve chamber of the second stage regulator while allowing the portion of the first stage piston bore above the first stage piston to be vented to ambient, allowing for more accurate control of movement of the first stage piston. This arrangement may also allow for a range of adjustment of the relative positions of the first and second stage regulator bodies, e.g., as needed to adjust a pressure at which the first stage regulator provides fluid to the second stage regulator.

These features can be seen in FIG. 1, where a gas delivery conduit 6 extends from the first piston 14 to the valve chamber 45 of the second stage 20. The conduit 6 is formed as a single, unitary part with the piston 14, but could be formed as a separate part that is attached to the piston 14. The conduit 6 has a proximal end that is attached to the piston 14, and distal end that is in fluid communication with the valve chamber 45, and a passage that extends along a length of the conduit 6 from the distal to the proximal end. The proximal end of the conduit 6 is in fluid communication with the lower, inner side of the piston 14, e.g., via one or more openings formed in the piston 14 near the plunger 12. As a result, gas emitted from the plunger channel 13 can flow into the passage of the conduit 6 and directly to the valve chamber 45. What this means is that pressurized gas delivered to the second stage 20 will not enter the piston bore 26 and the portion of the piston bore 26 above the piston 14 can be vented to atmosphere or ambient, allowing the piston spring 17 to alone determine the down force applied to the piston 14. This allows more accurate control of the first stage regulator 10 and/or adjustment of the pressure output by the first stage 10, e.g., by adjusting a compression force applied to the piston spring 17.

Also, the conduit 6 sealingly engages with a seal 7 to allow the conduit 6 to move into and out of the valve chamber 45 (with piston 14 movement) while resisting leakage of gas from the valve chamber 45. In this illustrative embodiment, the seal 7 is an o-ring that is captured between a washer 9 and a conduit guide sleeve 9 in an opening of the second stage body 44, although other arrangements are possible. This configuration also allows for the adjustment of positions of the first and second bodies 4, 44 relative to each other, e.g., as the second body 44 is threaded into engagement with the first body 4. This adjustment allows for relatively easy assembly and fluid connection of the first and second stages 10, 20 with each other, as well as allow for adjustment of the compression force on the piston spring 17, as discussed in more detail below.

Another aspect of the invention relates to positioning of the gas delivery conduit so as to extend along a central axis of the first stage piston. This arrangement helps allow for easier assembly of the regulator, e.g., because the first stage piston can be positioned in any rotational position relative to the first stage body and yet have the gas delivery conduit properly positioned for communication with the valve chamber of the second stage, e.g., when the second stage body is mated with the first stage body. For example, in FIG. 1, the gas delivery conduit 6 extends so that a central, vertical axis of the piston 14 passes through a center of the conduit 6. This central vertical axis of the piston 14 is also aligned with a central, vertical axis of the first body 4 and the second body 44, e.g., aligned with the axis about which the bodies 4, 44 are rotated to thread the second body 44 into the first body 4. As a result, the piston 14 can be simply positioned in the first body 4 and the second body 44 assembled to the first body 4 with the conduit 6 extending into the valve chamber 22.

In another aspect of the invention, adjustment of the second stage (or downstream stage) body in position relative to the first stage (or upstream stage) body serves to adjust a regulated pressure of fluid output by the first (or upstream) stage. This feature permits easier adjustment of the regulated pressure of the first stage, e.g., by eliminating dedicated adjustment caps or other components. Instead, for example, the first and second stage bodies may be rotated relative to each other to set a desired pressure output from the first stage where the first and second bodies are threadedly engaged. As can be seen in the illustrative embodiment of FIG. 1, rotating the second body 44 relative to the first body 4 will adjust the relative positions of the bodies, which adjusts a compressive force on the piston spring 17. As noted above, a lower compressive force on the spring 17 will generally reduce the regulated pressure of the first stage 10, whereas a higher compressive force will tend to increase the regulated pressure. To fix the relative positions of the bodies 4, 44, the second body 44 may be threaded into the first by 4 until a stop (such as a shoulder 47) on the second body 44 engages the first body 4. Other configurations are possible, of course, such as a set screw that prevents rotation of the bodies 4, 44 relative to each other, a locking nut that engages the threaded portion of the second body 44 and can be positioned to define a limit for threaded engagement of the bodies 4, 44, and others. As noted above, the bodies 4, 44 need not be threadedly engaged, and instead may be slidably engaged, e.g., so that the second body 44 is slidably received into a bore of the first body 4. In such a case, a detent, clip, clamp or other arrangement may be used to fix the positions of the bodies 4, 44 relative to each other.

In another aspect of the invention, the plungers used to control movement of the valve balls of the valve assemblies for the first and/or second stages may include a resilient contact portion that is used to contact and move the respective valve ball. In contrast to use of a relatively stiff and non-resilient contact portion, such as a steel element, the use of a resilient contact portion may help resist "slamming" of the ball against the valve seat, e.g., caused by abrupt opening and/or closing of the valve assembly. By using a resilient element, such as a rubber or plastic component, to contact the valve ball, the ball may move more gradually or slowly between open and closed positions. In this illustrative embodiment of FIG. 1, the plungers 12, 52 are equipped with a rubber ball, disc, pad or other contact element at a distal end of the plungers. Otherwise, the plungers 12, 52 may be made of a non-resilient material, such as a steel or high durometer plastic. The resilient element may be secured to the plunger in any suitable way, such as friction fit, adhesive, a clamp, forming a portion of the plunger body over a part of the resilient element to capture the resilient element, etc.

While the preferred embodiments of the present invention have been illustrated in detail, it should be apparent that modifications and adaptations to those embodiments may occur to one skilled in the art without departing from the scope of the present invention as set forth herein.

We claim:

1. A multi-stage fluid pressure regulator comprising:
    a first stage valve comprising a moveable first stage piston comprising a central axis and arranged to open and close a fluid flow path to control flow of fluid through the valve, and a gas delivery conduit formed as a single, unitary part with said first stage piston, wherein said gas delivery conduit extends along said central axis such that a distal end of said gas delivery conduit is in direct fluid communication with a second valve chamber of a second stage valve;
    a second stage valve in fluid communication with the gas delivery conduit, the second stage valve including said second valve chamber into which the distal end of the gas delivery conduit is positioned;
    a body, wherein said first stage valve is disposed within said body, and wherein said body is formed to include a vent extending therethrough;
    a first piston spring disposed within said body and urging said moveable first stage piston downwardly;
    a piston seal arranged to engage with a stepped surface of said moveable first stage piston and with a tapered surface of said piston bore to control the flow of gas from inside said moveable first stage piston;
    when said moveable first stage piston is moved downwardly by said piston spring, fluid flow from inside said moveable first stage piston is stopped by said piston seal, although fluid flow from said first valve chamber is permitted;
    when said moveable first stage piston is moved upwardly, fluid flow from inside said moveable first stage piston is permitted, but fluid flow from said first valve chamber is stopped.

2. The regulator of claim 1, further comprising a second stage piston arranged for movement to open and close the second stage valve.

3. The regulator of claim 1, wherein the gas delivery conduit is moveable into and out of the second valve chamber.

4. The regulator of claim 3, further comprising a seal that engages the gas delivery conduit and allows for sliding movement of the gas delivery conduit relative to the second valve chamber.

5. The regulator of claim 1, further comprising a second stage piston arranged for movement to open and close the second stage valve, the piston having an inner side and an outer side.

6. The regulator of claim 5, further comprising a second piston spring arranged to open the second stage valve.

7. The regulator of claim 6, wherein a pressure of gas released from the first and second stage valves, respectively, urges the first and second pistons to move to close the first and second stage valves.

8. The regulator of claim 7, wherein the first and second pistons are housed respectively in a first and a second regulator body.

9. A fluid pressure regulator comprising:
    a first stage valve comprising a moveable first stage piston comprising a central axis and arranged to open and close a fluid flow path to control flow of fluid through the valve, and a gas delivery conduit formed as a single, unitary part with said first stage piston, wherein said gas delivery conduit extends along said central axis such that a distal end of said gas delivery conduit is in direct fluid communication with a second valve chamber of a second stage valve, wherein the gas delivery conduit is moveable into and out of the second valve chamber;
    a body, wherein said first stage valve is disposed within said body, and wherein said body is formed to include a vent extending therethrough;
    a piston spring disposed within said body and urging said moveable first stage piston downwardly;
    a piston seal arranged to engage with a stepped surface of said moveable first stage piston and with a tapered surface of said piston bore to control the flow of gas from inside said moveable first stage piston;
    when said moveable first stage piston is moved downwardly by said piston spring, fluid flow from inside said moveable first stage piston is stopped by said piston seal, although fluid flow from said first valve chamber is permitted;
    when said moveable first stage piston is moved upwardly, fluid flow from inside said moveable first stage piston is permitted, but fluid flow from said first valve chamber is stopped.

10. The regulator of claim 9, wherein the first stage piston includes a first plunger arranged to contact a portion of the first stage valve to open and close the first stage valve.

11. The regulator of claim 9, wherein the first stage valve includes a valve ball and seal.

12. The regulator of claim 9, further comprising a second stage valve including a second valve chamber.

13. The regulator of claim 12, further comprising a seal that engages the gas delivery conduit and allows for sliding movement of the gas delivery conduit relative to the second valve chamber.

14. A multi-stage fluid pressure regulator comprising:
a first stage body including a first stage piston bore and defining a first stage valve chamber;
a first stage valve comprising a moveable first stage piston comprising a central axis and arranged to open and close a fluid flow path to control flow of fluid through the valve, and a gas delivery conduit formed as a single, unitary part with said first stage piston, wherein said gas delivery conduit extends along said central axis;
a second stage body including a second stage piston bore and defining a second stage valve chamber, the second stage body coupled to the first stage body such that the second stage valve chamber is in fluid communication with the first stage valve;
a second stage valve arranged to open and close a fluid flow path to control flow of fluid from the second stage valve chamber; and
a second stage piston arranged for movement in the second stage piston bore to open and close the second stage valve, the second stage piston having an inner side and an outer side,
wherein the first and second stage bodies are moveable relative to each other to adjust a pressure of fluid provided from the first stage valve to the second stage valve chamber;
wherein said first stage valve is disposed within said first stage body, and wherein said first stage body is formed to include a vent extending therethrough;
a piston spring disposed within said body and urging said moveable first stage piston downwardly;
a piston seal arranged to engage with a stepped surface of said moveable first stage piston and with a tapered surface of said piston bore to control the flow of gas from inside said moveable first stage piston;
when said moveable first stage piston is moved downwardly by said piston spring, fluid flow from inside said moveable first stage piston is stopped by said piston seal, although fluid flow from said first valve chamber is permitted;
when said moveable first stage piston is moved upwardly, fluid flow from inside said moveable first stage piston is permitted, but fluid flow from said first valve chamber is stopped.

15. The regulator of claim 14, wherein the first and second stage bodies are threadedly coupled together such that rotation of the second stage body relative to the first stage body moves the first and second stage bodies toward or away from each other and adjusts a pressure of fluid provided from the first stage valve.

16. The regulator of claim 15, further comprising a gas delivery conduit having a proximal end attached to the first stage piston and a distal end extending away from the first stage piston, the gas delivery conduit having a passage in fluid communication with the first stage valve.

17. The regulator of claim 16, wherein the gas delivery conduit is arranged along a central vertical axis of the first stage piston.

18. The regulator of claim 17, wherein the gas delivery conduit is moveable into and out of the second valve chamber.

* * * * *